United States Patent
Meister et al.

(10) Patent No.: US 10,598,859 B2
(45) Date of Patent: Mar. 24, 2020

(54) OPTOELECTRONIC COMPONENT

(71) Applicant: Technische Universität Berlin, Berlin (DE)

(72) Inventors: Stefan Meister, Berlin (DE); Hanjo Rhee, Berlin (DE); Christoph Theiss, Berlin (DE); Aws Al-Saadi, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 0 days.

(21) Appl. No.: 15/572,784

(22) PCT Filed: May 3, 2016

(86) PCT No.: PCT/DE2016/200201
§ 371 (c)(1),
(2) Date: Nov. 9, 2017

(87) PCT Pub. No.: WO2016/184460
PCT Pub. Date: Nov. 24, 2016

(65) Prior Publication Data
US 2018/0143378 A1 May 24, 2018

(30) Foreign Application Priority Data

May 15, 2015 (DE) .......... 10 2015 208 983

(51) Int. Cl.
*G02B 6/28* (2006.01)
*G02B 6/30* (2006.01)
(Continued)

(52) U.S. Cl.
CPC ....... *G02B 6/2852* (2013.01); *G02B 6/12004* (2013.01); *G02B 6/125* (2013.01);
(Continued)

(58) Field of Classification Search
None
See application file for complete search history.

(56) References Cited

U.S. PATENT DOCUMENTS 6,067,181 A 5/2000 Mizrahi
9,459,177 B1 * 10/2016 Dong .................. G01M 11/30
(Continued)

FOREIGN PATENT DOCUMENTS

CN 101414093 A 4/2009
CN 102893189 A 1/2013
(Continued)

OTHER PUBLICATIONS

International Search Report dated Aug. 17, 2016 issued in PCT/DE2016/200201.
(Continued)

*Primary Examiner* — Chad H Smith
(74) *Attorney, Agent, or Firm* — Gordon Rees Scully Mansukhani LLP

(57) ABSTRACT

An optoelectronic component including an optical waveguide integrated into a plane of the component. The optical waveguide configured to guide optical radiation in the plane. The component including a coupling element connected to the waveguide and coupling optical radiation into the waveguide along the main coupling path. The degree of coupling efficiency of the coupling element is less than one in respect to the main coupling path. The coupling element outputs optical loss radiation along a secondary coupling path. The optical loss radiation is proportional to the radiation transferred along the main coupling path. The optoelectronic component includes a detector connected to the coupling element that registers the optical loss radiation and produces a detector signal. The optoelectronic component includes a control unit configured to influence at least one operating
(Continued)

variable of the optoelectronic component based on the detector signal.

17 Claims, 6 Drawing Sheets

(51) Int. Cl.
```
G02B 6/42      (2006.01)
G02B 6/12      (2006.01)
G02B 6/125     (2006.01)
G02B 6/293     (2006.01)
```
(52) U.S. Cl.
CPC .......... *G02B 6/29341* (2013.01); *G02B 6/30* (2013.01); *G02B 6/4214* (2013.01)

(56) References Cited

U.S. PATENT DOCUMENTS

| | | | |
|---|---|---|---|
| 2002/0136259 | A1 | 9/2002 | Evans |
| 2003/0013304 | A1 | 1/2003 | Deliwala |
| 2005/0286602 | A1* | 12/2005 | Gunn .............. H01S 5/142 372/94 |
| 2009/0154512 | A1 | 6/2009 | Simons et al. |
| 2010/0265504 | A1 | 10/2010 | Kopp et al. |
| 2010/0322555 | A1 | 12/2010 | Vermeulen et al. |
| 2011/0274393 | A1* | 11/2011 | Reed ................. G02B 6/12007 385/37 |
| 2012/0294568 | A1 | 11/2012 | Zhang et al. |
| 2013/0209020 | A1* | 8/2013 | Doerr ................. G02F 1/011 385/2 |
| 2015/0286602 | A1 | 10/2015 | Buckland et al. |
| 2018/0045562 | A1* | 2/2018 | Santori ............. G02B 6/12007 |

FOREIGN PATENT DOCUMENTS

| | | |
|---|---|---|
| CN | 103616165 A | 3/2014 |
| WO | 2011/142913 A2 | 11/2011 |
| WO | WO 2014/056105 A2 | 4/2014 |

OTHER PUBLICATIONS

Haike Zhu et at.; "On-Chip Optical Power Monitor Using Periodically Interleaved P-N Junctions Integrated on a Silicon Waveguide"; IEEE Journal of Selected Topics in Quantum. Electronics; vol. 20, No. 4; Jul./Aug. 2014; pp. 56-63.

Francesco Morichetti et al.; "Non-Invasive On-Chip Light Observation by Contactless Waveguide Conductivity Monitoring"; IEEE Journal of Selected Topics in Quantum Electronics; vol. 20; No. 4; Jul./Aug. 2014; pp. 292-301.

T.K. Ling of al.; "Silicon waveguide two-photon absorption detector at 1.5 μm wavelength for autocorrelation measurements"; American Institute of Physics; Applied Physics Letters; vol. 81, No. 7; Aug. 12, 2002; pp. 1323-1325.

Takasumi Tanabe; "All-silicon sub-Gb/s telecom detector with low dark current and high quantum efficiency on chip"; American Institute of Physics; Applied Physics Letters; 96, 101103 (2010).

T. Baehr-Jones et al.; "Photodetection in silicon beyond the band edge with surface states"; Optics Express, vol. 16, No. 3; Feb. 4, 2008; pp. 1659-1668.

Hui Chen et al.; "Cavity-enhanced photocurrent generation by 1.55 μm wavelengths linear absorption in a p-i-n diode embedded silicon microring resonator:"; American Institute of Physics; Applied Physics Letters; 95; 171111 (2009).

J.D.B. Bradley; "Silicon waveguide-integrated optical power monitor with enhanced sensitivity at 1550 nm" American Institute of Physics; Applied Physics Letters 86; 241103 (2005).

M. W. Geis et al.; "CMOS-Compatible All-Si High-Speed Waveguide Photodiodes With High Responsivity in Near-Infrared Communication Band"; IEEE Photonics Technology Letters; vol. 19; No. 3; Feb. 1, 2007; pp. 152-154.

S.J. Spector et al.; "CMOS-compatible dual-output silicon modulator for analog signal processing"; Optics Express; vol. 16; No. 15; Jul. 21, 2008; pp. 11027-11031.

David J. Thomson et al.; "Silicon carrier depletion modulator with 10 Gbit/s driver realized in high-performance photonic BiCMOS"; Laser & Photonics Reviews 8, No. 1; pp. 180-187 (2014).

Christopher R. Doerr et al.; "Diplexer With Integrated Filters and Photodetector in Ge—Si Using Γ-X and Γ-M Directions in a Grating Coupler"; IEEE Photonics Technology Letters, vol. 21, No. 22; Nov. 15, 2009; pp. 1698-1700.

Wim Bogaerts, et al.; "A polarization-diversity wavelength duplexer circuit in silicon-on-insulator photonic wires"; Optics Express; vol. 15; No. 4; Feb. 19, 2007; pp. 1567-1578.

Wim Bogaerts et al.; "Silicon on-insulator nanophotonics", Optomechatronic Micro/Nano Devices and components III: Oct. 8-10, 2007; Lausanne, Switzerland; [Proceedings of Spie, ISSN 0277-786X]; Spie, Bellingham; Wash; vol. 5956; No. 1, Sep. 16, 2005; pp. 1-15; XP002488407.

F. Van Laere et al.; "Compact grating couplers between optical fibers and Silicon-on-Insulator photonic wire waveguides with 69% coupling efficiency"; Optical Fiber Communication Conference; OFC 2006; IEEE—Piscataway, NJ, USA; Jan. 2, 2006; pp. 1-5; XP008151262.

Robert Halir et al.; "Reducing Polarization-Dependent Loss of Silicon-on-Insulator Fiber to Chip Grating Couplers"; IEEE Photonics Technology Letters, IEEE Service Center, Piscataway, NJ, USA; vol. 22; No. 6, Mar. 15, 2010; pp. 389-391; XP011303538.

Chinese Office Action dated Jul. 2, 2019 issued in related Chinese Application No. 201680026789.5.

\* cited by examiner

OPTOELECTRONIC COMPONENT

The present invention relates to an optoelectronic component having the features according to the preamble of patent claim 1, and a method for operating optoelectronic components.

The publication "A polarization-diversity wavelength duplexer circuit in silicon-on-insulator photonic wires" (Wim Bogaerts, Dirk Taillaert, Pieter Dumon, Dries Van Thourhout, Roel Baets; 19 Feb. 2007/Vol. 15, No. 4/OPTICS EXPRESS 1567) discloses an optoelectronic component having an optical waveguide which is integrated within a plane of the component and which is able to guide optical radiation in the plane of the component, and a coupling element which is connected to the waveguide and which is able to couple optical radiation which is guided in the waveguide and which is fed from said waveguide into the coupling element, out of the plane, along a main coupling path, and/or is able to couple optical radiation which is fed at an angle into the plane of the waveguide, into the waveguide and thus into the plane of the component, along the main coupling path.

The object of the present invention is to provide an optoelectronic component, in which a measured variable for detecting an operating state of the component and for adjusting a desired operating variable, for example, a desired operating temperature of the component, or in the case of a radiation-generating component, a desired transmission power of the component, may be detected in a particularly simple manner.

This object is achieved according to the present invention via an optoelectronic component having the features according to patent claim 1. Advantageous embodiments of the component according to the present invention are provided in the subclaims.

Accordingly, it is provided according to the present invention that the coupling efficiency of the coupling element with respect to the main coupling path is less than one, and in the case of irradiation of optical radiation, the coupling element emits an optical radiation loss along an auxiliary coupling path which is proportional or at least approximately proportional to the radiation transmitted along the main coupling path; the optoelectronic component has a detector which is connected to the coupling element and which completely or at least partially detects the optical radiation loss and generates a detector signal; and the optoelectronic component has a control unit which is connected to the detector and which influences at least one operating variable of the optoelectronic component, based on the detector signal.

A significant advantage of the component according to the present invention may be seen in the fact that the radiation loss which the coupling element generates is evaluated according to the present invention and used for controlling the component. Specifically, according to the present invention, it is provided to measure the radiation loss of the coupling element by means of a detector, and based on the detector signal, to influence at least one operating variable, for example, the temperature of the component, or in the case of a radiation-generating component, to influence the transmission power of the component. In other words, according to the present invention, radiation loss which remains unused in previously known components is used in a targeted manner as a measured variable for the component control.

It is considered to be particularly advantageous if the angular coupling in and/or coupling out of the plane of the component takes place by means of a second waveguide; accordingly, in a particularly preferred embodiment of the component, it is provided that in addition to the aforementioned waveguide, hereinafter referred to as the first waveguide, the optoelectronic component has a second waveguide which is arranged with its longitudinal axis at an angle to the plane within which the integrated optical waveguide is integrated and is able to guide radiation, and the coupling element is connected to the first and second waveguides and is able to couple the optical radiation which is guided in the first waveguide and which is fed into the coupling element in the direction out of the plane and into the second waveguide, along the main coupling path, and/or is able to couple optical radiation which is guided in the second waveguide and which is fed from it into the coupling element, into the first waveguide and thus into the plane of the component, along the main coupling path.

Preferably, the control unit is designed in such a way that, based on the detector signal, said control unit influences the temperature of the optoelectronic component, as the operating variable or one of the operating variables of the optoelectronic component, for example, by means of a cooling and/or heating element.

It may also be provided that the optoelectronic component has a transmitting element, in particular a transmitting element which is connected to the first or second waveguide. In one such embodiment, it is advantageous if the control unit is designed in such a way that, based on the detector signal, said control unit influences the transmitting power of the transmitting element as the operating variable or one of the operating variables of the optoelectronic component.

Preferably, the normal of the opening cross section of the coupling front surface of the detector is parallel to the plane of the component within which the first waveguide is integrated and is able to guide its optical radiation.

The component preferably has or is made up of a semiconductor chip. The plane in which the first waveguide is able to guide optical radiation is preferably a chip plane of the semiconductor chip, in particular a layer plane of a semiconductor layer of a layer stack of the semiconductor chip.

Preferably, the coupling element couples optical radiation which is fed in at an angle into the plane of the first waveguide, along at least two main coupling paths, into the first waveguide and into at least one additional waveguide which lies in the same plane of the component as the first waveguide, and is able to guide optical radiation there.

The coupling efficiency of the coupling element with respect to the at least two main coupling paths is preferably less than one in each case, and the coupling element preferably has one associated auxiliary coupling path per main coupling path.

With respect to the irradiation, furthermore, it is considered to be advantageous if, in the case of angular irradiation of optical radiation into the plane of the waveguide, in particular in the case of irradiation of optical radiation via the second waveguide i.e., in the case of radiation deflection along the at least two main coupling paths, the coupling element emits an optical radiation loss along each of the auxiliary coupling paths, which is proportional or at least approximately proportional to the radiation transmitted along the respective main coupling path, and the detector completely or at least partially detects at least one of the radiation losses, preferably all radiation losses.

The coupling element couples the optical radiation which is guided in the first waveguide and/or in one of the additional waveguides and which is fed in from said waveguide into the coupling element, out of the plane of the waveguides at an angle, preferably along the respective main coupling paths, and thereby, for example, into the second waveguide.

With respect to the embodiment of the detector, it is considered to be advantageous if the detector is or comprises a photodiode. A detector layer of the photodiode lies, for example, in the plane within which the first waveguide is integrated and is able to guide radiation, and/or in a parallel plane.

The photodiode may, for example, be implemented as a germanium, indium phosphide, gallium arsenide, or indium-gallium arsenide photodiode, for example, in the form of a PIN or PN diode.

The coupling element preferably comprises a grating, a mirror, and/or a photonic crystal structure.

As is shown in greater detail below by way of example in conjunction with the figures, it is considered to be advantageous if the integrated optical waveguide is rectilinear in the region of the coupling element and has two rectilinear waveguide sections which are directly adjacent to the coupling element; the rectilinear waveguide sections are preferably aligned, viewed in the longitudinal direction of the waveguide or along the direction of propagation of the optical radiation, or lie rectilinearly in succession.

One of the two rectilinear waveguide sections preferably forms the main coupling path or at least a section of the main coupling path. The other one of the two rectilinear waveguide sections preferably forms the auxiliary coupling path or at least a section of the auxiliary coupling path.

In one particularly preferred embodiment, it is provided that the integrated optical waveguide, hereinafter referred to as the first waveguide, is rectilinear in the region of the coupling element and has two rectilinear waveguide sections which are directly adjacent to the coupling element and are aligned (or lie rectilinearly in succession), viewed in the longitudinal direction of the waveguide or along the direction of propagation of the optical radiation;

the coupling element couples optical radiation which is fed in at an angle into the plane of the first waveguide and into the coupling element, along at least two main coupling paths, into the first waveguide and into at least one additional waveguide which lies in the same plane of the component as the first waveguide and which is able to guide optical radiation there; and the at least one additional waveguide is rectilinear in the region of the coupling element and has two rectilinear waveguide sections which are directly adjacent to the coupling element and are aligned (or lie rectilinearly in succession), viewed in the longitudinal direction of the waveguide or along the direction of propagation of the optical radiation.

The first waveguide and the at least one additional waveguide are respectively rectilinear in the region of the coupling element and are preferably at an angle of between 70 and 90 degrees to one another.

The coupling element is preferably wavelength-independent or at least approximately wavelength-independent for the wavelength, the wavelengths, or the wavelength band of the optical radiation which is guided in the optoelectronic component or at least in the first waveguide, the second waveguide, and/or the at least one additional waveguide, and which the coupling element couples or is to couple. Here, the term "approximately wavelength-independent" is understood to mean that the coupling efficiency for the wavelengths or the wavelength band of the optical radiation fluctuates less than 20% (~1 dB), preferably less than 5% (~0.2 dB).

The present invention also relates to a method for operating an optoelectronic component having an optical waveguide which is integrated within a plane of the component and which is able to guide optical radiation in the plane of the component, and a coupling element which is connected to the waveguide and which is able to couple optical radiation which is guided in the waveguide and which is fed in from said waveguide into the coupling element, in the direction out of the plane, along a main coupling path, and/or is able to couple optical radiation which is fed at an angle into the plane of the waveguide, into the waveguide and thus into the plane of the component, along the main coupling path.

According to the present invention, with respect to such a method, it is provided that the coupling efficiency of the coupling element with respect to the main coupling path is less than one, and in the case of irradiation of optical radiation, the coupling element emits an optical radiation loss along an auxiliary coupling path which is proportional or at least approximately proportional to the radiation transmitted along the main coupling path; and the optical radiation loss is completely or at least partially detected and a detector signal is generated, and based on the detector signal, at least one operating variable of the optoelectronic component is influenced.

With respect to the advantages of the method according to the present invention, reference is made to the above embodiments in conjunction with the optoelectronic component according to the present invention.

The present invention will be described in greater detail below based on exemplary embodiments; the following are shown by way of example:

For the sake of clarity, in the figures, the same reference characters are always used for identical or comparable components.

Figure 1:
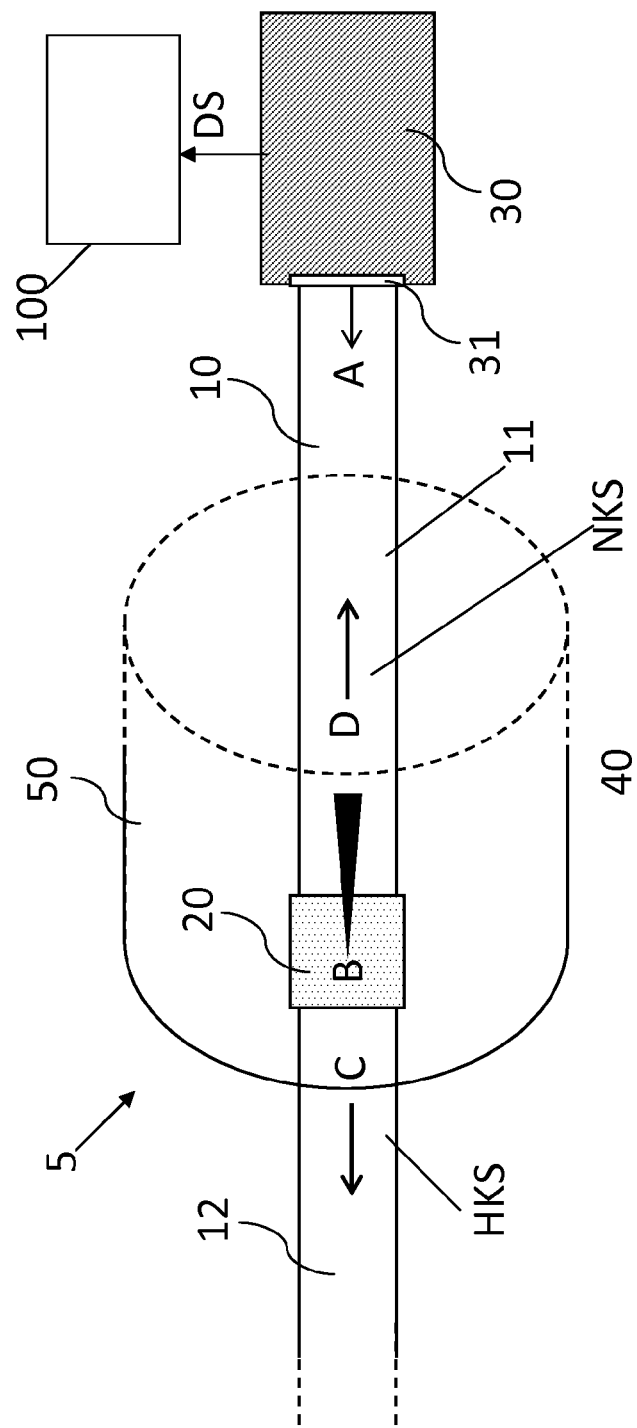
FIG. 1 shows an exemplary embodiment of an optoelectronic component according to the present invention, in which an optical fiber is oriented at an angle to a semiconductor chip, and a coupling element couples the optical fiber to a waveguide integrated within the semiconductor chip.

FIG. 1 shows a top view of an optoelectronic component 5, in which an integrated optical waveguide 10, a coupling element 20, and a detector 30 are integrated within a semiconductor chip 40 of the component 5. The reference characters X, Y, and Z refer to the spatial coordinates of the component.

The coupling element 20 couples the integrated optical waveguide 10, referred to below as the first waveguide, to a second waveguide, which is formed by an optical fiber 50 in the exemplary embodiment according to FIG. 1. The longitudinal axis of the optical fiber 50 is at an angle to the plane EB (cf. FIG. 2) in which the integrated optical waveguide 10, the coupling element 20, and the detector 30 are integrated within the semiconductor chip 40.

The coupling element 20 subdivides the integrated optical waveguide 10 in the depiction according to FIG. 1 into a right waveguide section 11 in FIG. 1 and a left waveguide section 12 in FIG. 1. The coupling element 20 is designed in such a way that it primarily couples the left waveguide section 12 to the optical fiber 50 and forms a main coupling path HKS between the left waveguide section 12 and the optical fiber 50. The coupling element 20 may, for example, be formed by a 1D or 2D grating coupler or a deflection unit.

The coupling efficiency of the coupling element 20 is very high with respect to the main coupling path HKS, i.e., between the left waveguide section 12 and the optical fiber 50; however, due to diffraction, refraction, scattering, and/or reflection, it is less than one, so that the coupling element 20 also couples the optical fiber 50 to the right waveguide section 11 in FIG. 1, and forms an auxiliary coupling path NKS between the right waveguide section 11 and the optical fiber 50.

With respect to the design of the detector 30, it may be seen in FIG. 1 that a coupling front surface 31 of the detector 30 which is connected to the integrated optical waveguide 10 is oriented in such a way that the normal of the opening cross section A of the coupling front surface 31 is parallel to the plane of the semiconductor chip 40 within which the integrated optical waveguide 10 and the coupling element 20 are integrated. The detector 30 may, for example, be implemented as a germanium, indium phosphide, gallium arsenide, or indium-gallium arsenide photodiode, or as a p- and n-doped semiconductor region as part of a PIN or PN diode.

A control unit 100 is connected to the detector 30 and evaluates a detector signal DS generated by the detector 30, and influences at least one operating variable of the optoelectronic component 5 using the detector signal DS.

The functionality of the optoelectronic component 5 is to be explained below by way of example for the case that the optical fiber 50 couples optical radiation B into the coupling element 20. In the case of coupling optical radiation B from the optical fiber 50, the coupling element 20 will couple the bulk of the radiation B into the left waveguide section 12 along the main coupling path HKS; the coupled radiation is identified in FIG. 1 by the reference character C.

Due to diffraction, refraction, scattering, and/or reflection in the coupling element 20, a small portion of the optical radiation B is coupled into the right waveguide section 11 as radiation loss D via the auxiliary coupling path NKS, and is transmitted via said waveguide section to the detector 30. The detector 30 generates the detector signal DS, which reaches the control unit 100.

Based on the magnitude of the detector signal DS, the control unit 100 may ascertain the radiation power which is coupled into the semiconductor chip 40 via the main coupling path HKS, and accordingly adjust the optical component 5. For example, the control unit 100 may be designed in such a way that it controls a cooling and/or heating element of the component 5 based on the detector signal DS, in order to keep the temperature of the optoelectronic component 5 within a desired temperature range.

In FIG. 1, it is apparent that the left waveguide section 12 and the right waveguide section 11 are respectively rectilinear in the region of the coupling element, and form two rectilinear waveguide sections which are directly adjacent to the coupling element 20. The rectilinear waveguide sections are aligned, viewed in the longitudinal direction of the waveguide or along the direction of propagation of the optical radiation, or lie in succession, viewed in the longitudinal direction of the waveguide or along the direction of propagation of the optical radiation.

Figure 2:
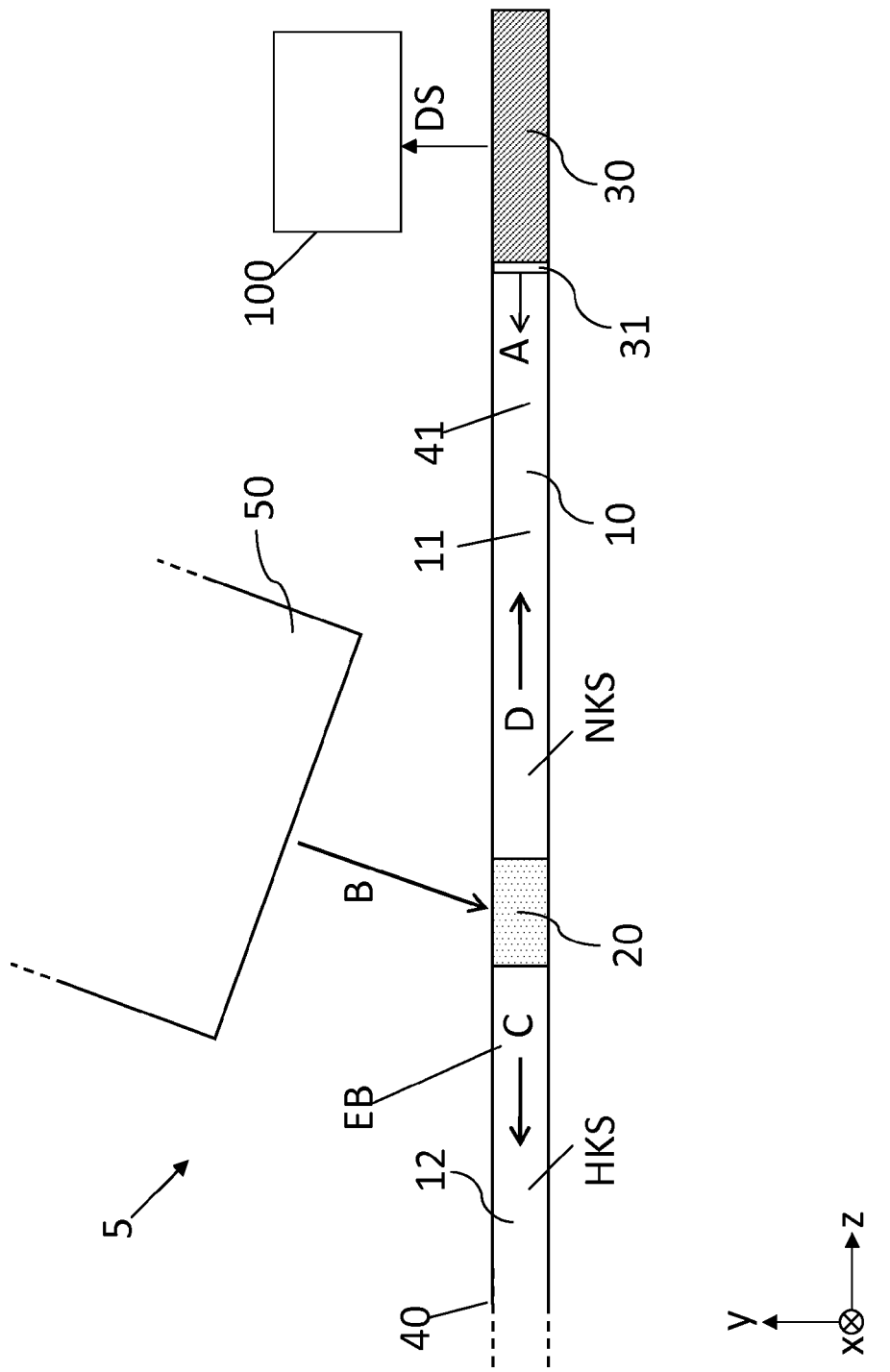
FIG. 2 shows the optoelectronic component according to FIG. 1, in a cross section.

FIG. 2 shows the optoelectronic component 5 according to FIG. 1, in a cross section. One can see the angular arrangement of the optical fiber 50 relative to the plane EB and thus to the optical waveguide 10 which is integrated within the plane EB of the semiconductor chip 40.

In addition, it is apparent that the integrated optical waveguide 10, the coupling element 20, and the detector 30 are integrated within one or multiple semiconductor layers 41 which are associated with a semiconductor layer stack of the semiconductor chip 40 which is not depicted further. The semiconductor chip 40 may, for example, be SOI (silicon on insulator) material; in this case, the semiconductor layer 41 is preferably a silicon layer which rests on a silicon dioxide layer.

Figure 3:
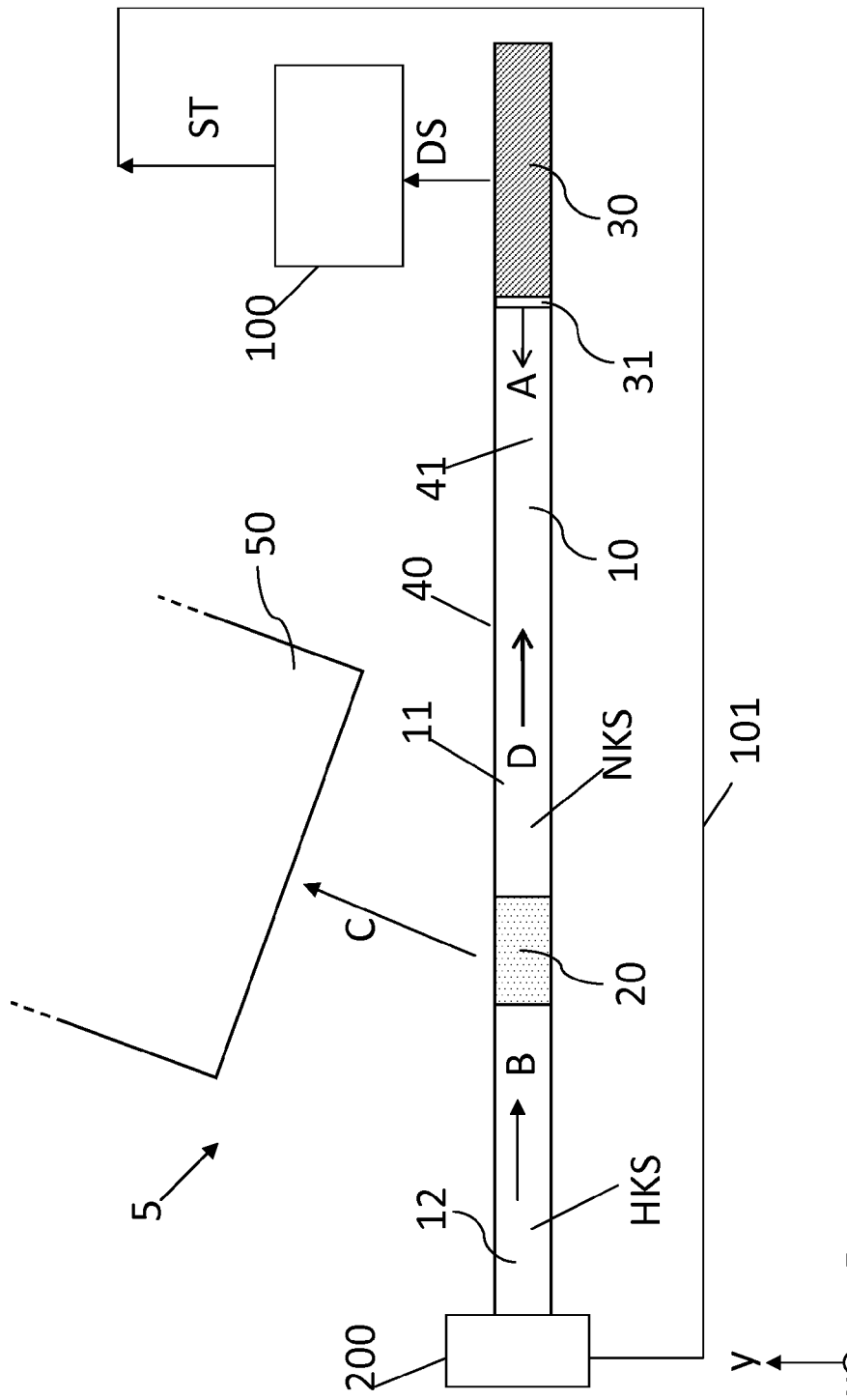
FIG. 3 shows an exemplary embodiment of an optoelectronic component which is equipped with a transmitting element.

FIG. 3 shows an exemplary embodiment of an optoelectronic component 5, which corresponds essentially to the first exemplary embodiment according to FIGS. 1 and 2. Unlike the first exemplary embodiment, in the exemplary embodiment according to FIG. 3, the left waveguide section 12 of the optical waveguide 10 is connected to a transmitting element 200.

The transmitting element 200 may generate optical radiation B and couple into the coupling element 20. The coupling element 20 will couple the coupled-in optical radiation B out of the plane of the semiconductor layer 41, and out of the semiconductor chip 40, along the main coupling path HKS, and will couple it into the optical fiber 50 which is arranged at an angle to the semiconductor chip 40. The radiation which is coupled out of the semiconductor chip 40 is identified in FIG. 3 by the reference character C.

In addition, due to diffraction, refraction, scattering, and/or transmission in the coupling element 20, the coupling element 20 will couple a small portion of the optical radiation B into the right waveguide section 11 as radiation loss D, along the auxiliary coupling path NKS, and will thus transmit it to the detector 30, which detects the radiation loss D using measurement techniques.

The detector 30 generates a detector signal DS, which reaches the control unit 100. The control unit 100 evaluates the detector signal DS and, based on the detector signal, influences, for example, at least one operating variable of the transmitting element 200, for example, the transmitting power of the transmitting element 200, and/or, for example, at least one heating element of the optoelectronic component 5, in order to keep the optoelectronic component 5, in particular the semiconductor chip 40, in a predefined operating parameter range, for example, in a predefined temperature range. In one exemplary embodiment, the control of the transmitting element 200 takes place according to FIG. 3 via a control signal ST which the control unit 100 transmits to the transmitting element 200 via a control line 101.

Figure 4:
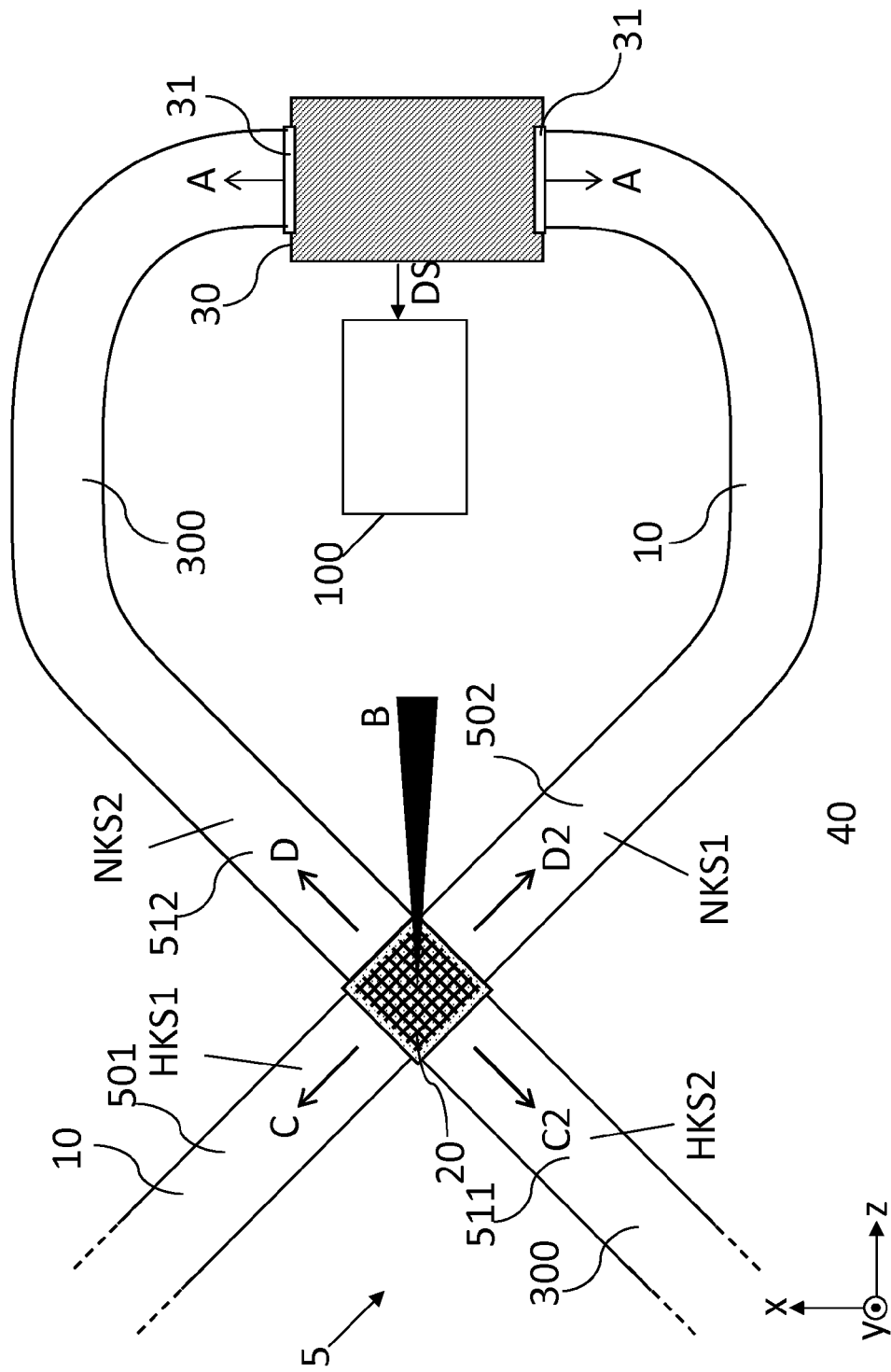
FIG. 4 shows an exemplary embodiment of an optoelectronic component according to the present invention, in which a coupling element has two main coupling paths and two auxiliary coupling paths.

FIG. 4 shows an exemplary embodiment of an optoelectronic component 5, in which a coupling element 20 which is integrated within a semiconductor chip 40 has or provides two main coupling paths HKS1 and HKS2 and two auxiliary coupling paths NKS1 and NKS2.

Via the first main coupling path HKS1, the coupling element 20 couples an optical waveguide 10, which is integrated within the semiconductor chip 40 and which is referred to below as the first waveguide, to a second waveguide which is situated outside the semiconductor chip 40 and which, for example, may be an optical fiber such as the optical fiber 50 according to FIGS. 1 to 3; the second waveguide is not depicted further in FIG. 4 for reasons of clarity.

In addition, the coupling element 20 couples the second waveguide to an additional waveguide, referred to below as the third waveguide 300, which, exactly like the waveguide 10, is integrated within the semiconductor chip 40, and is preferably arranged in the same waveguide plane as the waveguide 10. The first waveguide 10 and the third waveguide 300 are preferably perpendicular to one another.

If, for example, optical radiation B is coupled into the coupling element 20 via angular irradiation via the second waveguide, said optical radiation is coupled both into the first waveguide 10 and into the third waveguide 300 via the main coupling paths HKS1 and HKS2; the coupled-in radiation is identified in FIG. 4 by the reference characters C and C2.

In addition, the coupling element 20 will couple radiation loss D and D2 into the two waveguides 10 and 300 via the auxiliary coupling paths NKS1 and NKS2. The radiation loss D and D2 reaches coupling front surfaces 31 of a detector 30 via the waveguides 10 and 300, said detector detecting the radiation loss D and D2 using measuring techniques and generating a corresponding detector signal DS for a control unit 100 on the output side.

The control unit 100 may influence at least one operating variable of the optoelectronic component 5, based on the detector signal, as has already been explained in detail in conjunction with FIGS. 1 to 3.

In FIG. 4, it is apparent that the waveguide sections 501 and 502 of the waveguide 10 and the waveguide sections 511 and 512 of the waveguide 300 are respectively rectilinear in the region of the coupling element. The rectilinear waveguide sections 501 and 502, and 511 and 512, are aligned in pairs, viewed in the longitudinal direction of the waveguide or along the direction of propagation of the optical radiation.

Figure 5:
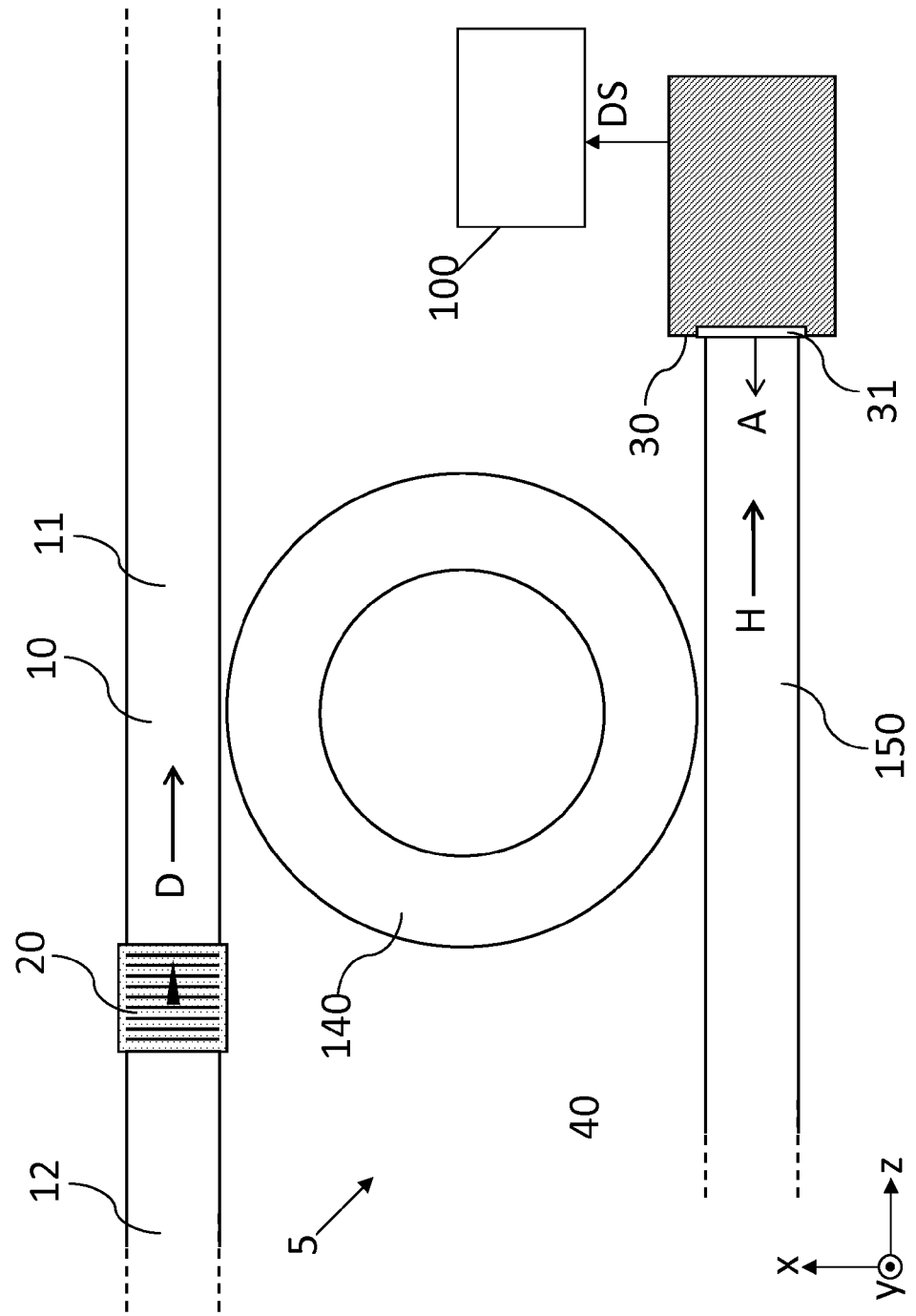
FIG. 5 shows an exemplary embodiment of an optoelectronic component in which radiation loss coupled out of a coupling element via an auxiliary coupling path is coupled into a detector via a ring resonator.

Moreover, additional passive or active photonic components, for example, ring resonators or Mach-Zehnder interferometers, may be added in the section between the coupling element 20 and the detector 30. These components may, for example, assume filtering functions for reducing the signal crosstalk or for spectral noise suppression. In one embodiment having a ring resonator, for example, a specific frequency component of a modulated signal may be filtered out and fed into the detector 30. FIG. 5 shows an exemplary embodiment of an optoelectronic component 5 which is equipped with a ring resonator 140.

In the exemplary embodiment according to FIG. 5, the radiation loss D which is coupled out of a coupling element 20 via an auxiliary coupling path NKS is coupled into a waveguide 150 via the ring resonator 140 and into a detector 30 via the waveguide 150. By means of the transmission spectrum of the ring resonator 140, spectral filtering takes place which, for example, may be adjusted or set via the ring geometry. For example, certain spectral modulation sidebands of a modulated data signal may be selectively transmitted. The filtered radiation loss H reaches the detector 30.

The detector 30 is connected to a control unit 100 which controls the optoelectronic component 5 or at least influences an operating variable of the optoelectronic component 5, based on the detector signal DS or based on the filtered radiation loss H. The above embodiments are correspondingly valid with respect to the functioning of the control unit 100, in conjunction with the exemplary embodiments according to FIGS. 1 to 4.

Figure 6:
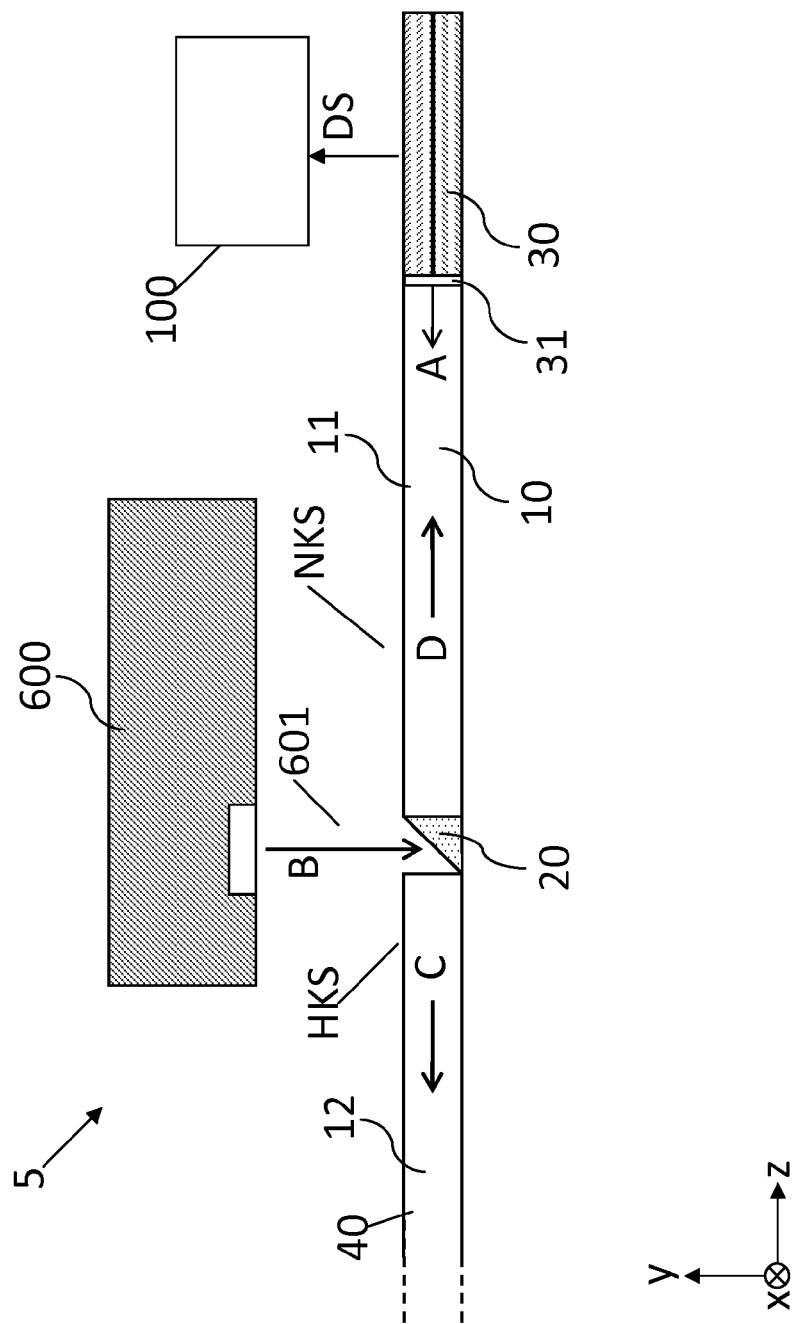
FIG. 6 shows an additional exemplary embodiment of an optoelectronic component which is equipped with a transmitting element.

FIG. 6 shows an exemplary embodiment of an optoelectronic component 5, in which a transmitting element 600 is coupled to a semiconductor chip 40 via a free space connection 601. A coupling element 20, a waveguide 10, and a detector 30 are integrated within the semiconductor chip 40.

The component 5 according to FIG. 6 may, for example, be operated as follows:

The transmitting element 600 generates optical radiation B, which is fed into the coupling element 20 and thus into the semiconductor chip 40 via the free space connection 601 at an angle, for example, at a right angle (with reference to the chip plane in which the coupling element 20, the waveguide 10, and the detector 30 are integrated). The coupling element 20 couples the bulk of the fed-in radiation into the left waveguide section 12 of the waveguide 10 in FIG. 6, via a main coupling path HKS; the coupled radiation is identified in FIG. 6 by the reference character C.

The coupling element 20 will couple a small portion of the fed-in optical radiation B into the right waveguide section 11 in FIG. 6, via an auxiliary coupling path NKS as radiation loss D. The radiation loss D reaches the detector 30, which detects the radiation loss D and generates a detector signal DS for a downstream control unit 100. Based on the detector signal DS, the control unit 100 influences at least one operating variable of the optoelectronic component 5, for example, the temperature of the semiconductor chip 40 and/or the transmitting power of the transmitting element 600.

LIST OF REFERENCE CHARACTERS

5 Optoelectronic component
10 First waveguide
11 Right waveguide section
12 Left waveguide section
20 Coupling element
30 Detector
31 Front coupling surface
40 Semiconductor chip
41 Semiconductor layers
50 Second waveguide/optical fiber
100 Control unit
101 Control line
140 Ring resonator
150 Waveguide
200 Transmitting element
300 Third waveguide
501 Waveguide section
502 Waveguide section
511 Waveguide section
512 Waveguide section
600 Transmitting element
601 Free space connection
A Normal of the opening cross section
B Optical radiation
C Coupled radiation
C2 Coupled radiation
D Radiation loss
D2 Radiation loss
DS Detector signal
EB Plane
H Radiation loss
HKS Main coupling path
HKS1 Main coupling path
HKS2 Main coupling path
NKS Auxiliary coupling path
NKS1 Auxiliary coupling path NKS2 Auxiliary coupling path
ST Control signal
X Spatial coordinate
Y Spatial coordinate
Z Spatial coordinate

The invention claimed is:

1. An optoelectronic component (5) having
an optical waveguide (10) which is integrated in a plane (EB) of the component (5) and which is able to guide optical radiation in the plane (EB) of the component (5), and
a coupling element (20) which is connected to the waveguide (10) and which is able to couple optical radiation which is guided in the waveguide (10) and which is fed from said waveguide into the coupling element (20), out of the plane (EB), along a main coupling path (HKS), and/or is able to couple optical radiation which is fed at an angle into the plane (EB) of the waveguide (10), into the waveguide (10) and thus into the plane (EB) of the component (5), along the main coupling path (HKS),
characterized in that
the coupling efficiency of the coupling element (20) with respect to the main coupling path (HKS) is less than one, and in a case of irradiation of optical radiation, the coupling element (20) emits an optical radiation loss (D) along an auxiliary coupling path (NKS) which is proportional or at least approximately proportional to the radiation transmitted along the main coupling path (HKS);
the optoelectronic component (5) has a detector (30) which is connected to the coupling element (20) via the auxiliary coupling path (NKS) and which completely or at least partially detects the optical radiation loss (D) and generates a detector signal (DS);
the optoelectronic component (5) has a control unit (100) which is connected to the detector (30) and which influences at least one operating variable of the optoelectronic component (5), based on the detector signal (DS);
wherein the coupling element (20) is located between the main coupling path (HKS) and the auxiliary coupling path (NKS) and separates the main coupling path (HKS) and the auxiliary coupling path (NKS) from one another;
wherein the integrated optical waveguide (10) and the coupling element are integrated within a semiconductor chip (40) of the component; and
wherein the control unit (100) is designed in such a way that, based on the detector signal (DS), said control unit influences the temperature of the semiconductor chip (40) as the operating variable or one of the operating variables of the optoelectronic component (5), by means of a heating element.

2. The optoelectronic component (5) as claimed in claim 1, characterized in that
in addition to the waveguide (10), hereinafter referred to as the first waveguide (10), the optoelectronic component (5) has a second waveguide (50) which is arranged with its longitudinal axis at an angle to the plane (EB) within which the integrated optical waveguide (10) is able to guide radiation; and
the coupling element (20) is connected to the first and second waveguides (10, 50) and is able to couple the optical radiation which is guided in the first waveguide (10) and which is fed into the coupling element (20) in the direction out of the plane (EB) and into the second waveguide (50), along the main coupling path (HKS), and/or is able to couple optical radiation which is guided in the second waveguide (50) and which is fed from it into the coupling element (20), into the first waveguide (10) and thus into the plane (EB) of the component (5), along the main coupling path (HKS).

3. The optoelectronic component (5) as claimed in claim 1, characterized in that
the optoelectronic component (5) has a transmitting element (200), in particular a transmitting element (200) which is connected to the first or a second waveguide (10, 50); and
the control unit (100) is designed in such a way that, based on the detector signal (DS), said control unit influences the transmitting power of the transmitting element (200) as the operating variable or one of the operating variables of the optoelectronic component (5).

4. The optoelectronic component (5) as claimed in claim 1, characterized in that
a normal of an opening cross section (A) of a coupling front surface (31) of the detector (30) is parallel to the plane (EB) of the component (5) within which the first waveguide (10) is integrated and is able to guide its optical radiation.

5. The optoelectronic component (5) as claimed claim 1 characterized in that
the component (5) is formed by a semiconductor chip (40), and
the plane (EB) in which the first waveguide (10) is able to guide optical radiation is a chip plane of the semiconductor chip (40), in particular a level plane of a semiconductor layer (41) of a level stack of the semiconductor chip (40).

6. The optoelectronic component (5) as claimed in claim 1, characterized in that the coupling element (20) couples optical radiation which is fed in at an angle into the plane (EB) of the first waveguide (10) and into the coupling element (20), along at least two main coupling paths (HKS1, HKS2), into the first waveguide (10) and into at least one additional waveguide (300) which lies in the same plane (EB) of the component (5) as the first waveguide (10), and is able to guide optical radiation there.

7. The optoelectronic component (5) as claimed in claim 6, characterized in that the coupling efficiency of the coupling element (20) with respect to the at least two main coupling paths (HKS1, HKS2) is less than one in each case, and the coupling element (20) has one associated auxiliary coupling path (NKS) per main coupling path (HKS1, HKS2).

8. The optoelectronic component (5) as claimed in claim 7, characterized in that
in the case of angular irradiation of optical radiation into the plane (EB) of the waveguide (10), in particular in the case of irradiation of optical radiation via the second waveguide (50), i.e., in the case of radiation deflection along the at least two main coupling paths (HKS1, HKS), the coupling element (20) emits an optical radiation loss (D, D2) along each of the auxiliary coupling paths, which is proportional or at least approximately proportional to the radiation transmitted along the respective main coupling path (HKS1, HKS2); and
the detector (30) completely or at least partially detects at least one of the radiation losses (D, D2), preferably all radiation losses.

9. The optoelectronic component (5) as claimed in claim 6, characterized in that the coupling element (20) couples the optical radiation which is guided in the first waveguide and/or one of the additional waveguides (10, 300) and which is fed from said waveguide into the coupling element (20), out of the plane (EB) of the waveguides (10) at an angle, along the respective main coupling paths (HKS1, HKS2), in particular into the second waveguide (50).

10. The optoelectronic component (5) as claimed in claim 1, characterized in that
the detector (30) is or comprises a photodiode which has a detector layer for receiving radiation, and
the detector layer lies in the plane (EB) within which the first waveguide (10) is integrated and is able to guide radiation, and/or lies in a parallel plane (EB).

11. The optoelectronic component (5) as claimed in claim 1, characterized in that
the coupling element (20) comprises a grating, a mirror, and/or a photonic crystal structure.

12. The optoelectronic component (5) as claimed in claim 1, characterized in that
the integrated optical waveguide (10) is rectilinear in the region of the coupling element (20) and has two rectilinear waveguide sections (11, 12, 501, 502) which are directly adjacent to the coupling element (20), and
the two rectilinear waveguide sections (11, 12, 501, 502) are aligned, viewed in the longitudinal direction of the waveguide or along the direction of propagation of the optical radiation.

13. The optoelectronic component (5) as claimed in claim 12, characterized in that
one of the two rectilinear waveguide sections (12, 501) forms the main coupling path (HKS) or at least a section of the main coupling path (HKS), and
the other one of the two rectilinear waveguide sections (11, 502) forms the auxiliary coupling path (NKS) or at least a section of the auxiliary coupling path (NKS).

14. The optoelectronic component (5) as claimed in claim 1, characterized in that
the integrated optical waveguide (10), hereinafter referred to as the first waveguide, is rectilinear in the region of the coupling element (20) and has two rectilinear waveguide sections (501, 502) which are directly adjacent to the coupling element (20) and are aligned, viewed in the longitudinal direction of the waveguide or along the direction of propagation of the optical radiation;
the coupling element (20) couples optical radiation which is fed in at an angle into the plane (EB) of the first waveguide (10) and into the coupling element (20), along at least two main coupling paths (HKS1, HKS2), into the first waveguide (10) and into at least one additional waveguide (300) which lies in the same plane (EB) of the component (5) as the first waveguide (10) and is able to guide optical radiation there; and
the at least one additional waveguide is rectilinear in the region of the coupling element (20) and has two rectilinear waveguide sections (511, 512) which are directly adjacent to the coupling element (20) and are aligned, viewed in the longitudinal direction of the waveguide or along the direction of propagation of the optical radiation.

15. The optoelectronic component (5) as claimed in claim 14, characterized in that the first waveguide (10) and the at least one additional waveguide (300) are respectively rectilinear in the region of the coupling element (20) and are preferably at an angle of between 70 and 90 degrees to one another.

16. The optoelectronic component (5) as claimed in claim 1, characterized in that
the coupling element (20) is wavelength-independent or at least approximately wavelength-independent for the wavelength, the wavelengths, or the wavelength band of the optical radiation which the coupling element couples.

17. A method for operating an optoelectronic component (5) having an optical waveguide (10) which is integrated within a plane (EB) of the component (5) and which is able to guide optical radiation in the plane (EB) of the component (5), and a coupling element (20) which is connected to the waveguide (10) and which is able to couple optical radiation which is guided in the waveguide (10) and which is fed from said waveguide into the coupling element (20), out of the plane (EB), along a main coupling path (HKS), and/or is able to couple optical radiation which is fed at an angle into the plane (EB) of the waveguide (10), into the waveguide (10) and thus into the plane (EB) of the component (5), along the main coupling path (HKS), characterized in that
the coupling efficiency of the coupling elements (20) with respect to the main coupling path (HKS) is less than one, and in a case of irradiation of optical radiation, the coupling element (20) emits an optical radiation loss (D) along an auxiliary coupling path (NKS) which is proportional or at least approximately proportional to the radiation transmitted along the main coupling path (HKS); and
the optical radiation loss (D) is completely or at least partially detected and a detector signal (DS) is generated,
based on the detector signal (DS), at least one operating variable of the optoelectronic component (5) is influenced;
wherein the coupling element (20) is located between the main coupling path (HKS) and the auxiliary coupling path (NKS) and separates the main coupling path (HKS) and the auxiliary coupling path (NKS) from one another; and
wherein the integrated optical waveguide (10) and the coupling element are integrated within a semiconductor chip (40) of the component; and
wherein a control unit (100) designed in such a way that, based on the detector signal (DS), said control unit influences the temperature of the semiconductor chip as the operating variable or one of the operating variables of the optoelectronic component (5), by means of a heating element.

* * * * *